US009987706B2

United States Patent
Sugama et al.

(10) Patent No.: US 9,987,706 B2
(45) Date of Patent: Jun. 5, 2018

(54) METHOD FOR PRODUCING A STAINLESS STEEL DIFFUSION-BONDED PRODUCT

(71) Applicant: NISSHIN STEEL CO., LTD., Tokyo (JP)

(72) Inventors: Atsushi Sugama, Yamaguchi (JP); Yukihiro Nishida, Yamaguchi (JP); Kazuyuki Kageoka, Yamaguchi (JP); Yoshiaki Hori, Yamaguchi (JP); Manabu Oku, Yamaguchi (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 56 days.

(21) Appl. No.: 14/888,975

(22) PCT Filed: May 15, 2013

(86) PCT No.: PCT/JP2013/063495
§ 371 (c)(1),
(2) Date: Nov. 4, 2015

(87) PCT Pub. No.: WO2014/184890
PCT Pub. Date: Nov. 20, 2014

(65) Prior Publication Data
US 2016/0114423 A1    Apr. 28, 2016

(51) Int. Cl.
*B23K 20/00* (2006.01)
*C22C 38/00* (2006.01)
(Continued)

(52) U.S. Cl.
CPC ............ *B23K 20/023* (2013.01); *B23K 20/00* (2013.01); *B23K 20/02* (2013.01); *B23K 20/227* (2013.01);
(Continued)

(58) Field of Classification Search
USPC .......................................... 228/193
See application file for complete search history.

(56) References Cited

U.S. PATENT DOCUMENTS 4,455,352 A * 6/1984 Ayres ............... B23K 20/227
148/521
6,024,276 A * 2/2000 Hirata ............... B23K 20/023
148/534
(Continued)

FOREIGN PATENT DOCUMENTS

JP    57-4431    1/1982
JP    61-210158    9/1986
(Continued)

*Primary Examiner* — Devang R Patel
(74) *Attorney, Agent, or Firm* — Clark & Brody

(57) ABSTRACT

A method for producing a stainless steel diffusion-bonded product provides a stainless steel material diffusion-bonded product having excellent reliability of the bonded portion by using a direct method, which includes directly contacting stainless steel materials with each other to unify the materials together by diffusion bonding. At least one of the stainless steel materials to be contacted is dual-phase steel having an austenite transformation starting temperature $Ac_1$ point of 650 to 950° C. during the temperature elevation and having an austenite+ferrite dual-phase temperature region in the range of 880° C. or higher. Diffusion bonding is advanced under conditions such that the contact surface pressure is in the range of 1.0 MPa or less and the heating temperature is in the range of from 880 to 1,080° C. while being accompanied by the movement of grain boundary caused when the ferrite phase in the dual-phase steel undergoes transformation to an austenite phase.

10 Claims, 5 Drawing Sheets

(51) Int. Cl.

| | |
|---|---|
| *B23K 20/02* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C21D 9/50* | (2006.01) |
| *B23K 35/30* | (2006.01) |
| *B23K 20/227* | (2006.01) |
| *C21D 6/00* | (2006.01) |
| *B23K 103/04* | (2006.01) |

(52) U.S. Cl.
CPC ........ *B23K 35/308* (2013.01); *B23K 35/3086* (2013.01); *C21D 9/50* (2013.01); *C22C 38/00* (2013.01); *C22C 38/001* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *B23K 2203/05* (2015.10); *C21D 6/002* (2013.01)

(56) References Cited

U.S. PATENT DOCUMENTS

| | | | | |
|---|---|---|---|---|
| 6,059,175 A | * | 5/2000 | Hamada | ................ B23K 20/16 228/194 |
| 6,156,134 A | * | 12/2000 | Shimizu | ............... B23K 20/023 148/526 |
| 2014/0346216 A1 | * | 11/2014 | Rigal | ................... B23K 20/021 228/194 |

FOREIGN PATENT DOCUMENTS

| | | |
|---|---|---|
| JP | 61-243117 | 10/1986 |
| JP | 62-199277 | 9/1987 |
| JP | 62-227597 | 10/1987 |
| JP | 63-119993 | 5/1988 |
| JP | 10-146681 | 6/1988 |
| JP | 63-215388 | 9/1988 |
| JP | 2-261548 | 10/1990 |
| JP | 4-294884 | 10/1992 |
| JP | 7-213918 | 8/1995 |
| JP | 9-99218 | 4/1997 |
| JP | 9-262685 | 10/1997 |
| JP | 9-279310 | 10/1997 |
| JP | 11-104854 | 4/1999 |
| JP | 11-129078 | 5/1999 |
| JP | 2000-303150 | 10/2000 |
| JP | 2000303150 A * | 10/2000 |
| JP | 2001-115894 | 4/2001 |
| JP | 2013-103271 | 5/2013 |

\* cited by examiner

[Fig. 1]
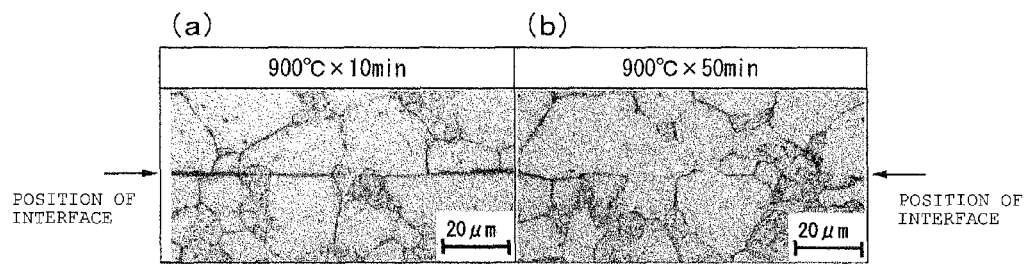
[Fig. 2]
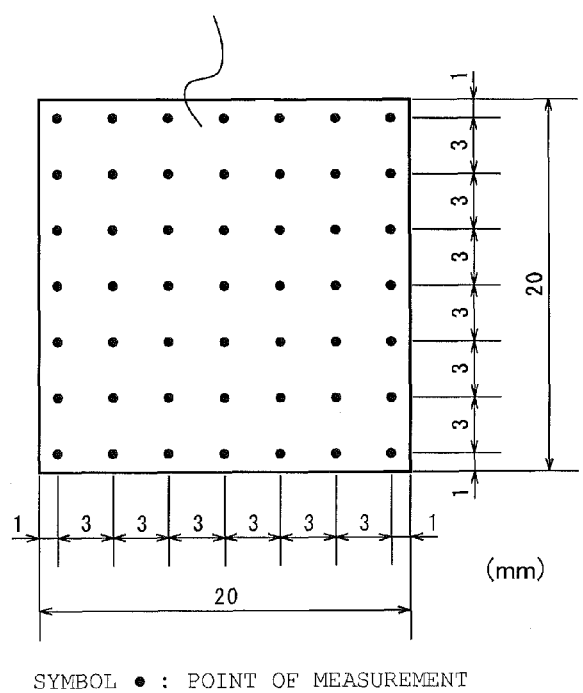
SYMBOL ● : POINT OF MEASUREMENT

[Fig. 3]
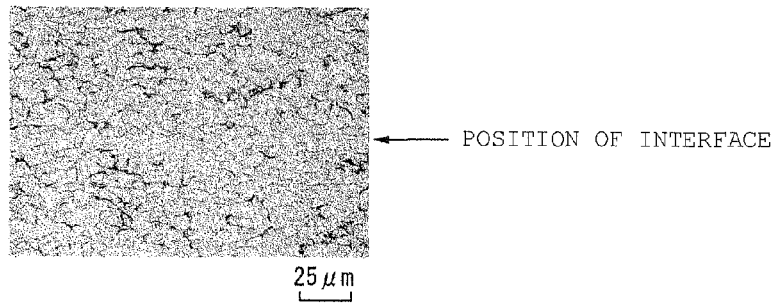
← POSITION OF INTERFACE
[Fig. 4]
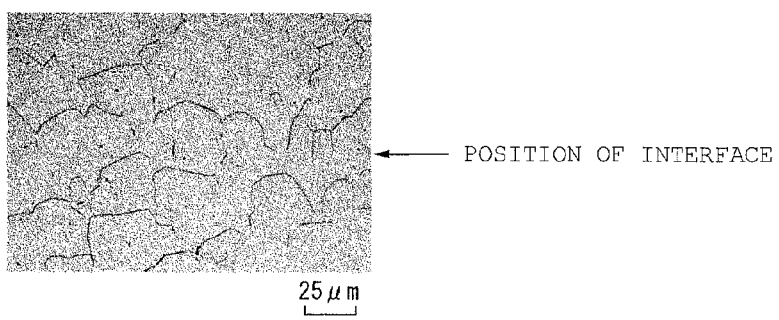
← POSITION OF INTERFACE
[Fig. 5]
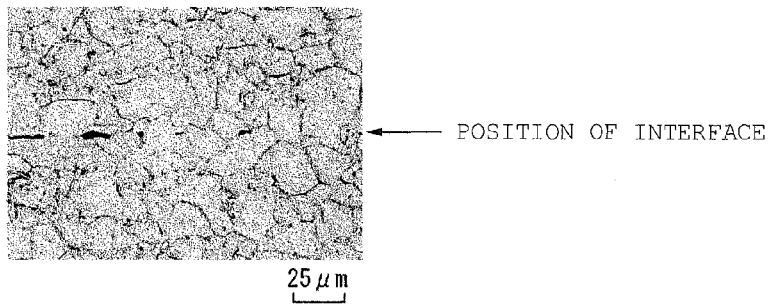
← POSITION OF INTERFACE
[Fig. 6]
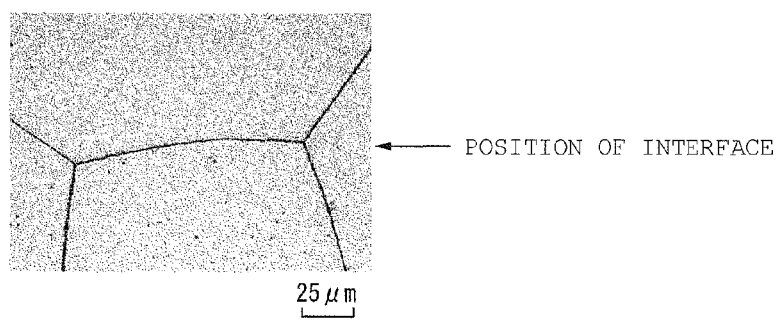
← POSITION OF INTERFACE

[Fig. 7]
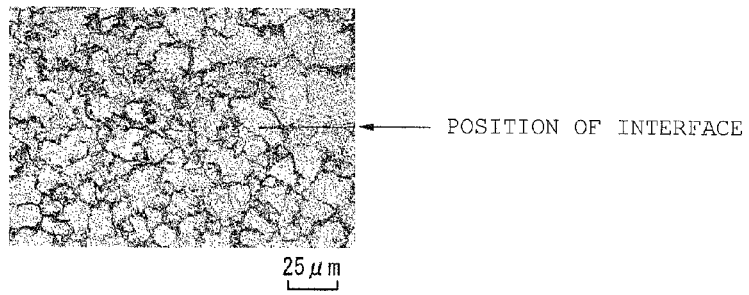
← POSITION OF INTERFACE
25 μm
[Fig. 8]
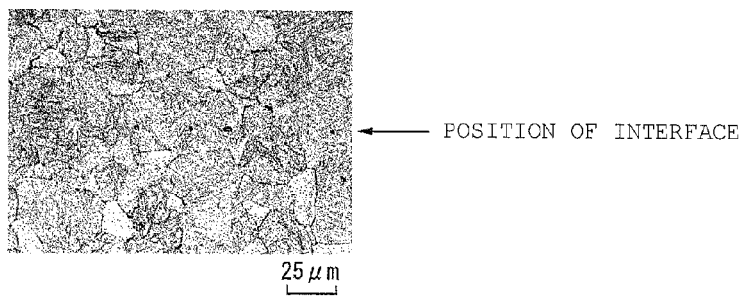
← POSITION OF INTERFACE
25 μm
[Fig. 9]
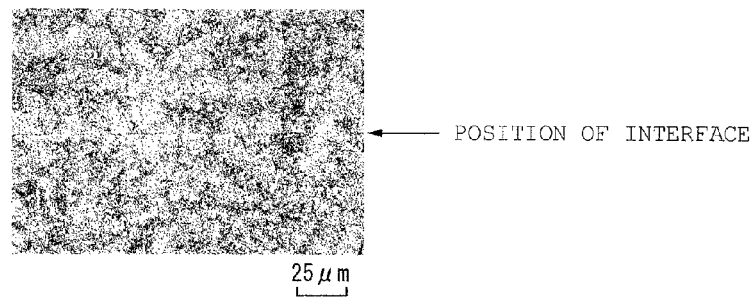
← POSITION OF INTERFACE
25 μm
[Fig. 10]
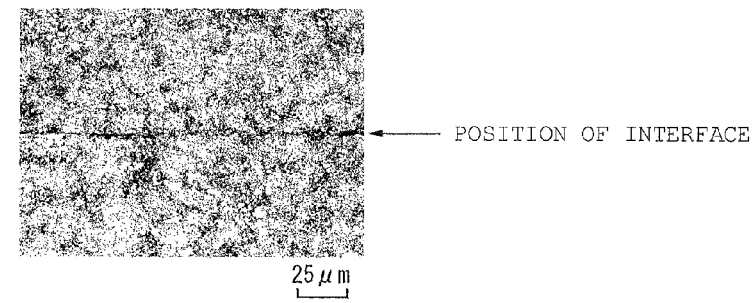
← POSITION OF INTERFACE
25 μm

[Fig. 11]
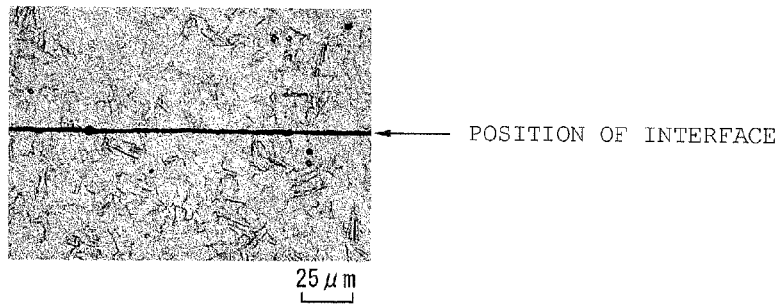
[Fig. 12]
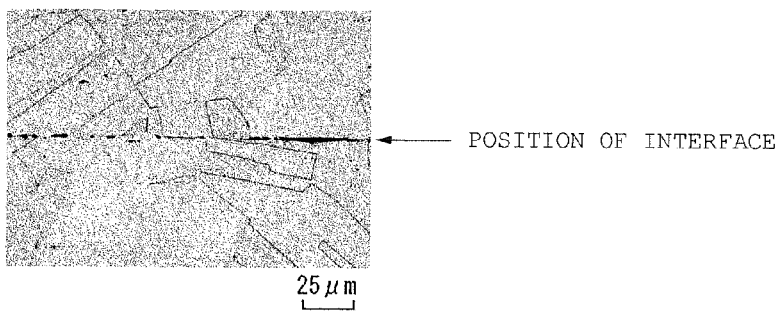
[Fig. 13]
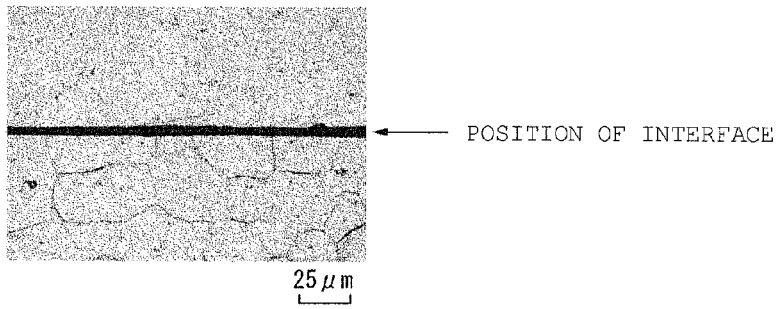

[Fig. 14]
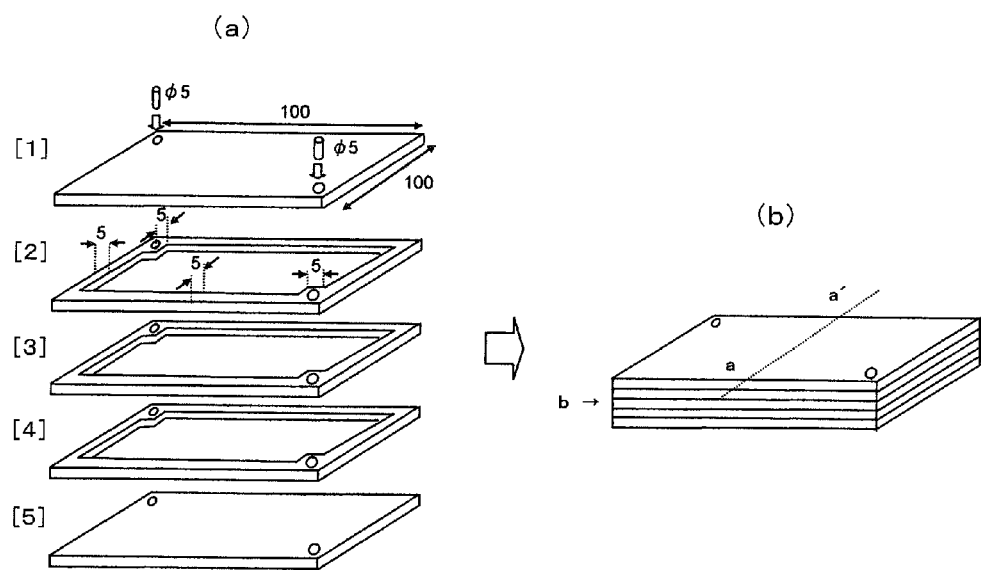

METHOD FOR PRODUCING A STAINLESS STEEL DIFFUSION-BONDED PRODUCT

TECHNICAL FIELD

The present invention relates to a method for producing a stainless steel diffusion-bonded product by diffusion-bonding stainless steel materials without using an insert material.

BACKGROUND ART

Diffusion bonding is one of methods for bonding together stainless steel materials, and stainless steel diffusion-bonded products assembled by diffusion bonding are applied to various uses, such as a heat exchanger, mechanical parts, parts for a fuel cell, parts for an electrical appliance, parts for a plant, members constituting a decorative article, and building materials. As methods for diffusion bonding, there are an "insert material insertion method" in which an insert material is inserted into the interface between materials to be bonded to cause solid phase diffusion or liquid phase diffusion so as to bond together the materials, and a "direct method" in which the surfaces of stainless steel materials are directly contacted with each other and diffusion-bonded together.

As an insert material insertion method, there have conventionally been known many techniques, for example, a method using dual-phase stainless steel as an insert material (Patent Literature 1), a liquid-phase diffusion bonding method using an insert material in a foil form being plated with Ni and Au several μm thick and having the same composition as that of the material to be bonded (Patent Literature 2), and a method using austenitic stainless steel containing Si in a large amount in the range of 11.5% or less as an insert material (Patent Literature 3). Further, "brazing" using a nickel based brazing material (for example, JIS: BNi-1 to 7) or a copper based brazing material as an insert material can be regarded as a kind of liquid-phase diffusion bonding. These insert material insertion methods have an advantage in that diffusion bonding can be surely and relatively easily achieved. However, as compared to the direct method, the insert material insertion methods are disadvantageous in that the use of an insert material increases the cost, and in that the bonding portion made of a metal different from the materials bonded may cause the corrosion resistance to become poor.

On the other hand, generally, the direct method is unlikely to achieve a satisfactory bonding strength, as compared to the insert material insertion method. However, the direct method has the capability to advantageously reduce the production cost, and hence various studies have also been made on the direct method. For example, Patent Literature 4 discloses a technique in which stainless steel materials having a S content of 0.01% or less in the steel are subjected to diffusion bonding in a non-oxidizing atmosphere at a predetermined temperature so as to avoid deformation of the materials, thus improving the diffusion bonding properties of the stainless steel materials. Patent Literature 5 discloses a method in which a stainless steel foil material having a surface roughened by an acid pickling treatment is used. Patent Literature 6 discloses a method in which stainless steel having an Al content suppressed so that an alumina film which is a factor in inhibiting diffusion bonding is unlikely to be formed during the diffusion bonding is used as a material to be bonded. Patent Literature 7 discloses that diffusion is promoted by using a stainless steel foil having deformation imparted thereto by cold working. Patent Literature 8 has a description of ferritic stainless steel having an appropriate composition for direct diffusion bonding.

CITATION LIST

Patent Literature

PTL 1: JP-A-63-119993
PTL 2: JP-A-4-294884
PTL 3: JP-B-57-4431
PTL 4: JP-A-62-199277
PTL 5: JP-A-2-261548
PTL 6: JP-A-7-213918
PTL 7: JP-A-9-279310
PTL 8: JP-A-9-99218
PTL 9: JP-A-2000-303150

SUMMARY OF INVENTION

Technical Problem

The above-mentioned techniques and the like have enabled diffusion bonding of stainless steel materials by a direct method. However, the direct method has not been industrially mainly used as a diffusion bonding method for stainless steel materials. The main reason for this resides in that, by the direct method, it is difficult to both secure reliability of the bonded portion (bonding strength and sealing properties) and suppress the load on the production. According to the conventional findings, for securing reliability of the bonded portion in the direct method, it is necessary to employ a step having a large load, such as a step in which the bonding temperature is as high as more than 1,100° C., or a step in which a high contact pressure is applied by hot pressing, HIP or the like, inevitably increasing the cost. When diffusion bonding for stainless steel materials is performed with a work load equivalent to that of a general insert material insertion method, it is currently difficult to secure satisfactory reliability of the bonded portion.

The present invention aims for providing a stainless steel material diffusion-bonded product having excellent reliability of the bonded portion by using a "direct method" which can be performed with a work load equivalent to that of a conventional insert material insertion method.

Solution to Problem

As a result of the thorough studies conducted by the inventors, it has been found that, by utilizing the movement of grain boundary caused when the ferrite phase undergoes transformation to an austenite phase during the diffusion bonding, diffusion in the boundary between the stainless steel materials is promoted without applying special high-temperature heating or high contact pressure. In the invention, stainless steel materials are diffusion-bonded without using an insert material by utilizing the growth of crystal grains caused due to the phase transformation (movement of the phase boundary).

Specifically, in the invention, there is provided a method for producing a stainless steel diffusion-bonded product, comprising directly contacting stainless steel materials with each other to unify the materials together by diffusion bonding, wherein at least one of the stainless steel materials to be contacted is dual-phase steel having an austenite transformation starting temperature $Ac_1$ point of 650 to 950° C. during the temperature elevation and having an austenite+ ferrite dual-phase temperature region in the range of 880° C. or higher, and the diffusion bonding is advanced under conditions such that the contact surface pressure is in the range of 1.0 MPa or less and the heating temperature is in the range of from 880 to 1,080° C. while being accompanied by the movement of grain boundary caused when the ferrite phase in the dual-phase steel undergoes transformation to an austenite phase.

Particularly, at least one of the stainless steel materials to be contacted can be dual-phase steel having the chemical composition (A) below and having an austenite+ferrite dual-phase temperature region in the range of 880° C. or higher, chemical composition (A) comprising from 0.0001 to 0.15% of C, from 0.001 to 1.0% of Si, from 0.001 to 1.0% of Mn, from 0.05 to 2.5% of Ni, from 13.0 to 18.5% of Cr, from 0 to 0.2% of Cu, from 0 to 0.5% of Mo, from 0 to 0.05% of Al, from 0 to 0.2% of Ti, from 0 to 0.2% of Nb, from 0 to 0.2% of V, from 0 to 0.01% of B, and from 0.005 to 0.1% of N, all in terms of percentage by mass, with the balance of Fe and unavoidable impurities, and having an X value represented by the formula (1) below of 650 to 950:

$$X \text{ value} = 35(Cr+1.72Mo+2.09Si+4.86Nb+8.29V+ \\ 1.77Ti+21.4Al+40.0B-7.14C-8.0N-3.28Ni- \\ 1.89Mn-0.51Cu)+310 \quad (1)$$

Generally, stainless steel is classified into austenitic stainless steel, ferritic stainless steel, martensitic stainless steel, and the like based on the metallic structure at room temperature, and the term "dual-phase steel" in the present specification means steel which has an austenite+ferrite dual-phase structure in the temperature region of the $Ac_1$ point or higher. Such dual-phase steel includes stainless steel classified as ferritic stainless steel or martensitic stainless steel.

As examples of combinations of the stainless steel materials to be subjected to diffusion bonding, there can be mentioned the following three patterns.

[Pattern 1] Case where both the stainless steel materials to be subjected to diffusion bonding are dual-phase steel having the chemical composition (A) above.

[Pattern 2] Case where one of the stainless steel materials to be subjected to diffusion bonding is dual-phase steel having the chemical composition (A) above and another one is steel having the chemical composition (B) below.

[Pattern 3] Case where one of the stainless steel materials to be subjected to diffusion bonding is dual-phase steel having the chemical composition (A) below and another one is steel having the chemical composition (C) below.

Chemical composition (B) comprising from 0.0001 to 0.15% of C, from 0.001 to 4.0% of Si, from 0.001 to 2.5% of Mn, from 0.001 to 0.045% of P, from 0.0005 to 0.03% of S, from 6.0 to 28.0% of Ni, from 15.0 to 26.0% of Cr, from 0 to 7.0% of Mo, from 0 to 3.5% of Cu, from 0 to 1.0% of Nb, from 0 to 1.0% of Ti, from 0 to 0.1% of Al, from 0 to 0.3% of N, from 0 to 0.01% of B, from 0 to 0.5% of V, from 0 to 0.3% of W, and from 0 to 0.1% of the total of Ca, Mg, Y, and REM (rare earth elements), all in terms of percentage by mass, with the balance of Fe and unavoidable impurities.

Chemical composition (C) comprising from 0.0001 to 0.15% of C, from 0.001 to 1.2% of Si, from 0.001 to 1.2% of Mn, from 0.001 to 0.04% of P, from 0.0005 to 0.03% of S, from 0 to 0.6% of Ni, from 11.5 to 32.0% of Cr, from 0 to 2.5% of Mo, from 0 to 1.0% of Cu, from 0 to 1.0% of Nb, from 0 to 1.0% of Ti, from 0 to 0.2% of Al, from 0 to 0.025% of N, from 0 to 0.01% of B, from 0 to 0.5% of V, from 0 to 0.3% of W, and from 0 to 0.1% of the total of Ca, Mg, Y, and REM (rare earth elements), all in terms of percentage by mass, with the balance of Fe and unavoidable impurities.

(B) is a range for the composition encompassing austenitic stainless steel, and (C) is a range for the composition encompassing ferritic stainless steel.

When the dual-phase steel having the composition (A) above is particularly steel having a γmax represented by the formula (2) below of 20 to less than 100, the degree of freedom of the conditions for diffusion bonding is further increased. When such steel is provided, the diffusion bonding is preferably advanced under conditions such that the contact surface pressure is in the range of from 0.03 to 0.8 MPa and the holding temperature is in the range of from 880 to 1,030° C.

$$\gamma\text{max} = 420C-11.5Si+7Mn+23Ni-11.5Cr-12Mo+ \\ 9Cu-49Ti-50Nb-52Al+470N+189 \quad (2)$$

In the formulae (1) and (2) above, for the position of a constituent element, a value of the content of the element represented by percentage by mass is substituted. 0 (zero) is substituted for the element which is not contained.

Advantageous Effects of Invention

The stainless steel diffusion-bonded structure in the invention has excellent bonding strength and excellent sealing properties, and uses no insert material and hence is effective in avoiding a lowering of the corrosion resistance caused by a contact with a metal different from steel (particularly, a metal including Cu). Further, the contact surface pressure and temperature can be reduced, as compared to those in the diffusion bonding of stainless steel materials by a conventional direct method, making it possible to use general diffusion bonding facilities applied to the insert material insertion method. Therefore, the production cost reduction effect obtained by using no insert material is not offset by an increase of the work load. Thus, the invention contributes to spreading of stainless steel diffusion-bonded products having high reliability.

BRIEF DESCRIPTION OF DRAWINGS

FIG. 1 Cross-sectional structure photographs of the bonding interface and the vicinity thereof in the diffusion bonding made at 900° C. using the dual-phase steel in the invention in both the steel materials.

FIG. 2 View showing the positions of points of thickness measurement by an ultrasonic thickness meter with respect to the surface of the stacked material subjected to diffusion bonding.

FIG. 3 Cross-sectional structure photograph of the stacked material which has been subjected to diffusion bonding test (example of the invention).

FIG. 4 Cross-sectional structure photograph of the stacked material which has been subjected to diffusion bonding test (comparative example).

FIG. 5 Cross-sectional structure photograph of the stacked material which has been subjected to diffusion bonding test (example of the invention).

FIG. 6 Cross-sectional structure photograph of the stacked material which has been subjected to diffusion bonding test (comparative example).

FIG. 7 Cross-sectional structure photograph of the stacked material which has been subjected to diffusion bonding test (example of the invention).

FIG. 8 Cross-sectional structure photograph of the stacked material which has been subjected to diffusion bonding test (comparative example).

FIG. 9 Cross-sectional structure photograph of the stacked material which has been subjected to diffusion bonding test (comparative example).

FIG. 10 Cross-sectional structure photograph of the stacked material which has been subjected to diffusion bonding test (comparative example).

FIG. 11 Cross-sectional structure photograph of the stacked material which has been subjected to diffusion bonding test (comparative example).

FIG. 12 Cross-sectional structure photograph of the stacked material which has been subjected to diffusion bonding test (comparative example).

FIG. 13 Cross-sectional structure photograph of the stacked material which has been subjected to diffusion bonding test (comparative example).

FIG. 14 Views diagrammatically showing sizes and shapes of individual stainless steel materials which are the materials to be bonded used in Example 2 and an external shape of the diffusion-bonded product.

DESCRIPTION OF EMBODIMENTS

Generally, it is considered that diffusion bonding of stainless steel materials in the state of being directly contacted with each other is completed through the following processes.

[1] A process in which the uneven contact surfaces deform and are in close contact with each other to increase the contact area.

[2] A process in which surface oxide films present on the contact surfaces of the both steel materials decompose and diffuse and thus disappear.

[3] A process in which interdiffusion of atoms and growth of crystal grains occur.

[4] A process in which the residual gas in the voids between the contact surfaces reacts with the metal base material and disappears.

The surface oxide film on the stainless steel material is a strongly passive film and therefore, particularly, for completing the process [2], it is necessary to retain the steel materials with a high contact surface pressure and a high temperature for a long time. This is a cause of inhibition of commercial spreading of the direct diffusion bonding method for stainless steel materials.

The inventors have conducted extensive and intensive studies. As a result, they have found a method of achieving direct diffusion bonding for stainless steel materials without a need for completion of the process [2] above. An essential feature of the method resides in that diffusion bonding is carried out utilizing a driving force of phase transformation caused near the contact surface of the stainless steel materials. By this method, industrial direct diffusion bonding can be performed under conditions at a lower temperature and a lower contact surface pressure than those in conventional methods, and further the reliability of the bonded surface is improved.

FIG. 1 shows an example of a cross-sectional structure near the bonding interface obtained by diffusion bonding at 900° C. using in both the steel materials the dual-phase steel having the chemical composition in the invention. This dual-phase steel is steel corresponding to D-2 in Table 1 below, and the metallic structure of the steel before subjected to diffusion bonding is a (ferrite phase)+($M_{23}C_6$ (wherein M is a metal element, such as Cr) based carbide). 2D finished plate materials having a thickness of 1.0 mm are used as specimens, and the surfaces of the specimens each having a surface roughness Ra of 0.21 μm are directly contacted with each other at a contact surface pressure of 0.3 MPa, and the resultant specimens are placed in a chamber having a pressure of $10^{-3}$ Pa by evacuation and the temperature of the specimens is elevated by a heater from room temperature to 900° C. in about one hour, and, after the temperature has reached 900° C., that temperature is maintained, and, at a point in time when a predetermined period of holding time has lapsed, the resultant specimen is removed from the furnace and rapidly cooled, and the cross-sectional structure is examined. FIG. 1(a) shows the stage at a holding time of 10 minutes, and FIG. 1(b) shows the stage at a holding time of 50 minutes.

In the present specification, the position at which the members were contacted with each other before subjected to diffusion bonding is referred to as "the position of interface".

As seen in FIG. 1(a), in the stage at a holding time of 10 minutes, crystal grains are formed across the position of interface. These crystal grains are those corresponding to an austenite phase which is formed by transformation from the ferrite phase and carbide before the temperature elevation (the photograph was taken after rapid cooling from the holding temperature, and therefore the above-mentioned austenite phase is shown as a martensite phase in the photograph). In this example, the metallic structure before the diffusion bonding is (ferrite phase)+carbide, and therefore the carbide serves as a starting point to cause transformation to an austenite phase. The formed austenite crystals grow while expanding the grain boundary in the ferrite phase. That is, austenite crystal grains grow while being accompanied by the movement of grain boundary caused when the ferrite phase undergoes transformation to an austenite phase.

In the example of FIG. 1, both the steel materials are the same dual-phase steel. Therefore, the carbide in one of the steel materials present near the position of interface serves as a starting point to form an austenite phase, and, when the formed austenite phase grows, the austenite crystal grains have incorporated thereinto part of the crystals of the steel material on the other side and grow into a single austenite crystal grain, so that diffusion bonding proceeds. In the stage of FIG. 1(a), many unbonded portions remain in the position of interface.

It has been confirmed that also when the steel material on the other side is steel which becomes an austenite single phase at the holding temperature for diffusion bonding or steel which becomes a ferrite single phase at the holding temperature, austenite crystal grains, which are formed using as a starting point the carbide in the dual-phase steel present near the position of interface, grow across the position of interface also into the crystals of the steel material on the other side.

The metallic structure of the dual-phase steel in the invention is of a (ferrite phase)+carbide, of a (ferrite phase)+ (martensite phase), or of a martensite single phase according to the chemical composition or the conditions for producing a steel plate. For utilizing the diffusion of atoms caused by the movement of grain boundary due to transformation from the ferrite phase to an austenite phase during the diffusion bonding, it is desired that the ferrite phase is present in an amount of 50% by volume or more at a point in time when the formation of austenite is started by heating for the diffusion bonding. When the dual-phase steel to be subjected to diffusion bonding has a metallic structure of a martensite single phase, preliminarily annealing the steel so as to have a structure of a (ferrite phase)+(martensite phase) is effective. In the annealing, conditions such that the material is maintained at, for example, 600° C. to (Ac$_1$ point+50° C.) can be employed, but, generally, an annealing effect is obtained during the temperature elevation in the diffusion bonding, and the formation of an austenite phase can be started in a state of structure such that a ferrite phase is present.

Austenite crystals of dual-phase steel having a structure of (ferrite phase)+carbide are formed using the carbide as a starting point, and those of dual-phase steel having a structure of (ferrite phase)+(martensite phase) are formed using the martensite phase as a starting point. In any of the above cases, the austenite crystals in the dual-phase steel grow while moving the grain boundary into the ferrite phase around the austenite crystals. In this instance, in the position of interface between the steel materials, the crystal grain boundary moves toward the steel material on the other side before complete disappearance of the oxide as a barrier to the diffusion.

By satisfactorily securing the holding time at a temperature at which the diffusion bonding proceeds, the increase of the austenite phase volume ratio is ended, so that the movement of grain boundary occurs in the remaining ferrite crystal grains. Then, as shown in FIG. 1(b), the ferrite crystal grains which have grown across the position of interface are observed. In this stage, the unbonded portions remaining in the position of interface are markedly reduced, and thus it can be considered that the steel materials have been unified together by diffusion bonding. The below-mentioned measurement using an ultrasonic thickness meter can confirm the state in which almost all the portions in the position of interface are bonded together.

[Dual-Phase Steel]

In the invention, for achieving diffusion bonding by a direct method at a low temperature and a low contact surface pressure, at least one of the stainless steel materials to be subjected to diffusion bonding is steel (dual-phase steel) having an austenite+ferrite dual-phase structure in a temperature region in which the diffusion bonding proceeds. Specifically, dual-phase steel having an austenite transformation starting temperature Ac$_1$ point of 650 to 950° C. during the temperature elevation and having an austenite+ferrite dual-phase temperature region in the range of 880° C. or higher is preferred. Steel having an Ac$_1$ point of 880° C. or higher inevitably has a dual-phase temperature region in the range of 880° C. or higher, and, when the Ac$_1$ point is too high, the lower limit of the dual-phase temperature region is increased, and hence the lower limit of the set heating temperature is increased, making it difficult to fully use the merit of the invention that diffusion bonding is conducted without using an insert material at a relatively low temperature by utilizing the movement of grain boundary caused when the ferrite phase in the dual-phase steel undergoes transformation to an austenite phase. As a result of various studies, the use of the steel having an Ac$_1$ point in the range of 950° C. or lower is effective, and the steel having an Ac$_1$ point of 900° C. or lower is more preferred.

The dual-phase steel used in the invention may be a steel type classified as so-called "martensitic stainless steel" as long as the steel has an austenite+ferrite dual-phase structure in a temperature region in which the diffusion bonding is advanced. The martensitic stainless steel is a steel type such that a martensite structure is obtained by rapidly cooling steel from the austenite single phase region of temperature as high as, for example, 1,050° C. or higher, and there is also present martensitic stainless steel having a composition which enables diffusion bonding utilizing the movement of crystal grain boundary caused due to the transformation to an austenite phase in the austenite+ferrite dual-phase temperature region. Therefore, such martensitic stainless steel is handled also as the dual-phase steel in the present specification.

As a specific example of the composition of constituents of the dual-phase steel in the invention, there can be mentioned a composition satisfying the following (A).

Composition (A) comprising from 0.0001 to 0.15% of C, from 0.001 to 1.0% of Si, from 0.001 to 1.0% of Mn, from 0.05 to 2.5% of Ni, from 13.0 to 18.5% of Cr, from 0 to 0.2% of Cu, from 0 to 0.5% of Mo, from 0 to 0.05% of Al, from 0 to 0.2% of Ti, from 0 to 0.2% of Nb, from 0 to 0.2% of V, from 0 to 0.01% of B, and from 0.005 to 0.1% of N, all in terms of percentage by mass, with the balance of Fe and unavoidable impurities, and having an X value represented by the formula (1) below of 650 to 950:

$$X \text{ value}=35(Cr+1.72Mo+2.09Si+4.86Nb+8.29V+1.77Ti+21.4Al+40.0B-7.14C-8.0N-3.28Ni-1.89Mn-0.51Cu)+310 \quad (1)$$

The X value is an index from which an austenite transformation starting temperature Ac$_1$ point (° C.) during the temperature elevation can be presumed with high accuracy with respect to the dual-phase steel having an austenite+ferrite dual-phase temperature region in the range of 880° C. or higher.

As the dual-phase steel having the chemical composition (A) above, particularly, steel having a γmax represented by the formula (2) below of 20 to less than 100 can be used.

$$\gamma max=420C-11.5Si+7Mn+23Ni-11.5Cr-12Mo+9Cu-49Ti-50Nb-52Al+470N+189 \quad (2)$$

γmax is an index for the amount (% by volume) of the austenite phase formed when the steel is heated and retained at about 1,100° C. The steel having a γmax of 100 or more can be regarded as a steel type that becomes an austenite single phase at a high temperature. In the steel having a γmax of 20 to less than 100, it is easy to set the temperature so as to avoid the γ single phase region, and the degree of freedom of the appropriate conditions is increased to the lower temperature and lower contact surface pressure side. The steel having a γmax of 50 to 80 is further preferably used.

[Steel Type of the Opposite Material to be Bonded]

With respect to the steel material (the opposite steel material) to be unified by diffusion bonding with the steel material comprising the above-mentioned dual-phase steel, the dual-phase steel can be used. Alternatively, an austenitic steel type that becomes an austenite single phase in the heating temperature region for diffusion bonding or a ferritic steel type that becomes a ferrite single phase in that temperature region can be used. Even when steel other than the dual-phase steel is used in the opposite steel material, the austenite phase which grows in the dual-phase steel by transformation also grows from the position of interface toward the opposite steel material, making it possible to constitute a sound diffusion-bonded portion through crystal grains formed across the position of interface.

With respect to the austenitic or ferritic steel type, various existing steel types can be applied according to the use and, from the viewpoint of the diffusion bonding properties, the composition of constituents of the steel is not particularly required to be specified. As specific examples of ranges of the composition of constituents, there can be mentioned the composition (B) below of an austenitic steel type and the composition (C) below of a ferritic steel type.

Composition (B) comprising from 0.0001 to 0.15% of C, from 0.001 to 4.0% of Si, from 0.001 to 2.5% of Mn, from 0.001 to 0.045% of P, from 0.0005 to 0.03% of S, from 6.0 to 28.0% of Ni, from 15.0 to 26.0% of Cr, from 0 to 7.0% of Mo, from 0 to 3.5% of Cu, from 0 to 1.0% of Nb, from 0 to 1.0% of Ti, from 0 to 0.1% of Al, from 0 to 0.3% of N, from 0 to 0.01% of B, from 0 to 0.5% of V, from 0 to 0.3% of W, and from 0 to 0.1% of the total of Ca, Mg, Y, and REM (rare earth elements), all in terms of percentage by mass, with the balance of Fe and unavoidable impurities.

Composition (C) comprising from 0.0001 to 0.15% of C, from 0.001 to 1.2% of Si, from 0.001 to 1.2% of Mn, from 0.001 to 0.04% of P, from 0.0005 to 0.03% of S, from 0 to 0.6% of Ni, from 11.5 to 32.0% of Cr, from 0 to 2.5% of Mo, from 0 to 1.0% of Cu, from 0 to 1.0% of Nb, from 0 to 1.0% of Ti, from 0 to 0.2% of Al, from 0 to 0.025% of N, from 0 to 0.01% of B, from 0 to 0.5% of V, from 0 to 0.3% of W, and from 0 to 0.1% of the total of Ca, Mg, Y, and REM (rare earth elements), all in terms of percentage by mass, with the balance of Fe and unavoidable impurities.

[Diffusion Bonding Conditions]

The contact surface pressure between the members to be subjected to diffusion bonding is 1.0 MPa or less. When the contact surface pressure is 1.0 MPa or less, diffusion bonding without using an insert material can be performed using relatively simple facilities. Such a contact surface pressure that the diffusion bonding proceeds may be set to fall in the range of 1.0 MPa or less according to the steel type used or the heating holding temperature or holding time. Especially when the steel having a γmax of less than 100 is used as the dual-phase steel, it is likely that an advantageous result is obtained at a contact surface pressure of 0.8 MPa or less. On the other hand, when the contact surface pressure is extremely low, a prolonged heating holding time is required, so that the productivity becomes poor. From an industrial point of view, a contact surface pressure of 0.03 MPa or more is preferably secured, and the contact surface pressure may be controlled to be 0.1 MPa or more. The surface of the stainless steel material to be subjected to diffusion bonding, which surface is to be bonded, is desirably smooth such that the Ra is 0.30 μm or less. The finishing of the surface may be performed with any of acid pickling, bright annealing, and polishing.

The heating temperature for diffusion bonding is 880° C. or higher. According to the studies made by the inventors, when utilizing the movement of grain boundary caused due to the transformation of the dual-phase steel, the stainless steel materials can be diffusion-bonded together without maintaining the materials at a high temperature as conventionally employed, but, when conditions such that the contact surface pressure is 1.0 MPa or less are employed, heating at 880° C. or higher is desired. Heating at 900° C. or higher is more preferred from the viewpoint of promoting the diffusion.

It is necessary that the steel materials are heated and retained in the austenite+ferrite dual-phase temperature region of the dual-phase steel used in both or one of the members. By retaining the steel materials in the temperature region in which these two phases coexist, newly growing austenite crystal grains are likely to grow across the position of interface toward the opposite steel material contacted therewith. The mechanisms of this have not yet been completely elucidated, but are presumed as follows. When the dual-phase steel in a state such that a ferrite phase is present in the dual-phase steel is heated to the austenite+ferrite dual-phase coexisting temperature region, the carbide or martensite phase in the dual-phase steel first serves as a starting point to form austenite crystals. The grain boundary between the formed austenite crystals and the ferrite crystals around the austenite crystals becomes in a state such that the grain boundary very easily moves due to the "driving force of transformation" which causes the ratio of the ferrite phase and the austenite phase to be close to an equilibrium state. Utilizing the driving force of transformation, the austenite crystals grow while moving the grain boundary into the adjacent ferrite crystals in the dual-phase steel. In this instance, it is considered that the growing austenite crystal grains facing the position of interface with the opposite steel material contacted therewith move the grain boundary also into the crystal grains of the opposite steel material contacted therewith and expand so as to be in the form of being more stably present in view of energy, resulting in austenite crystal grains formed across the position of interface. When the members at the position of interface between them are partially connected by the austenite crystal grains, the crystal grains of the both members present facing the position of interface near the austenite crystal grains also cause movement of the grain boundaries due to diffusion with respect to each other, so that diffusion bonding proceeds.

It has been confirmed that, when steel which becomes a ferrite single phase at 880° C. or higher or steel which becomes an austenite single phase at that temperature is used instead of the above-mentioned dual-phase steel, an unbonded portion (defect) is likely to remain in the position of interface under low contact surface pressure and low temperature heating conditions such that the contact surface pressure is 1.0 MPa or less and the heating temperature is 880 to 1,080° C. From this, it is apparent that utilizing the above-mentioned transformation driving force of the dual-phase steel is extremely advantageous in promoting the progress of diffusion bonding for the stainless steel materials under low contact surface pressure and low temperature heating conditions.

The dual-phase steel having a chemical composition such that the γmax represented by the formula (2) above is 100 or less has a temperature region, in which the steel has an austenite+ferrite dual-phase structure, in the temperature range of generally lower than 1,100° C. According to the studies made by the inventors, when the dual-phase steel having a γmax adjusted to 20 to less than 100 is used, the diffusion bonding can be advanced under conditions such that the contact surface pressure is in the range of from 0.03 to 0.8 MPa and the heating temperature is in the range of from 880 to 1,030° C., and this advantageously lowers the contact surface pressure and temperature for diffusion bonding conditions. Especially when the dual-phase steel having a γmax of 50 to 80 is used, the degree of freedom of the diffusion bonding conditions is further increased, and appropriate conditions can be found in a range such that the contact surface pressure is from 0.03 to 0.5 MPa and the heating temperature is from 880 to 1,000° C. In this case, the upper limit of the heating temperature may be set to fall in a low temperature range, for example, of 980° C. or lower.

Heating for the diffusion bonding can be made by heating and holding the members to be bonded in an atmosphere evacuated so as to have generally a pressure of $10^{-3}$ Pa or less like the conventional, general diffusion bonding of stainless steel materials using an insert material. In this heating, the stainless steel materials to be bonded are directly contacted with each other without using an insert material. The contact surface pressure is set to fall in the range of 1.0 MPa or less as mentioned above. As a heating method, there can be employed a method in which the whole of the members in a furnace is uniformly heated by a heater, or a method in which a site near the contacted portion is heated to a predetermined temperature by resistance heating by passing a current through it. The heating holding time may be set to fall in the range of from 30 to 120 minutes.

EXAMPLES

Example 1

Steel plates having the chemical compositions shown in Table 1 were prepared. D-1 to D-3 are steel having a γmax of less than 100, M-1 and M-2 are steel classified as so-called martensitic stainless steel, F-1 is ferrite single-phase steel, and A-1 is austenite single-phase steel. The thickness, surface finish, and surface roughness Ra of each steel plate are also shown in Table 1. With respect to the metallic structure of each of the prepared steel plates, D-1 to D-3 have a (ferrite phase)+carbide, M-1 and M-2 have a (ferrite phase)+(martensite phase), M-3 has a martensite single phase, F-1 has a ferrite single phase, and A-1 has an austenite single phase.

the contact surfaces of the specimens. Hereinafter, the two test specimens stacked are respectively referred to as "steel material 1" and "steel material 2", and a material having the steel material 1 and steel material 2 which are stacked on one another is referred to as "stacked material".

The steel material 1 and steel material 2 were subjected to diffusion bonding by the heating treatment described below. Using the above-mentioned fixture, a predetermined load was applied to the stacked material, and the fixture and the stacked material in this state were placed in a vacuum furnace, and the furnace was evacuated to a degree of vacuum such that the pressure was $10^{-3}$ to $10^{-4}$ Pa, and then the temperature was elevated for about one hour to a predetermined heating temperature set to fall in the range of 880° C. or higher, and that temperature was maintained for 2 hours, and then the resultant material was transferred to a cold chamber and cooled. In cooling, the above-mentioned degree of vacuum was maintained until the temperature became a temperature 100° C. lower than the holding temperature, and then Ar gas was introduced into the cham-

TABLE 1

| | Chemical composition (% by mass) | | | | | | | | | | | | X value | Steel plate | | | |
|---|---|---|---|---|---|---|---|---|---|---|---|---|---|---|---|---|
| Steel | C | Si | Mn | Ni | Cr | Cu | Mo | Al | Ti | Nb | N | Others | *1 | γmax | Thickness (mm) | Surface finish | Ra (μm) | Remark |
| D-1 | 0.063 | 0.53 | 0.32 | 2.04 | 16.55 | 0.04 | — | 0.009 | 0.004 | — | 0.007 | — | 661.2 | 71.2 | 0.8 | 2HD | 0.06 | Steel in the invention |
| D-2 | 0.068 | 0.39 | 0.76 | 0.12 | 16.06 | 0.05 | 0.04 | — | — | — | 0.057 | — | 805.1 | 63.2 | 1.0 | 2D | 0.21 | Steel in the invention |
| D-3 | 0.109 | 0.41 | 0.32 | 0.16 | 12.32 | — | 0.17 | — | 0.020 | 0.02 | 0.009 | — | 716.8 | 94.5 | 1.6 | 2D | 0.18 | Steel in the invention |
| M-1 | 0.340 | 0.56 | 0.55 | 0.13 | 13.40 | 0.04 | — | — | — | — | 0.015 | — | 678.8 | 185.5 | 1.0 | 2D | 0.15 | Steel in the invention |
| M-2 | 0.980 | 0.28 | 0.43 | 0.12 | 16.25 | — | 0.21 | — | — | — | 0.005 | — | 623.4 | 416.1 | 2.1 | 2B | 0.07 | Steel in the invention |
| M-3 | 0.036 | 1.48 | 0.36 | 6.82 | 14.46 | 0.60 | 0.12 | 0.028 | 0.310 | — | 0.009 | — | 142.8 | 171.7 | 1.0 | 2D | 0.16 | Comparative steel |
| F-1 | 0.010 | 0.51 | 0.34 | 0.13 | 18.22 | 0.44 | — | — | — | 0.36 | 0.012 | — | 995.7 | −26.2 | 1.2 | 2D | 0.27 | Comparative steel |
| A-1 | 0.053 | 0.50 | 0.77 | 8.55 | 18.10 | 0.25 | 0.19 | 0.005 | — | — | 0.028 | — | −62.8 | 212.3 | 1.0 | 2D | 0.09 | Comparative steel |

*1) In the steel in the invention, the value substantially corresponds to Ac1 point (° C.).

20 mm×20 mm flat plate test specimens were cut from each steel plate, and two test specimens were stacked and subjected to diffusion bonding by the method described below.

The two test specimens to be subjected to diffusion bonding were stacked so that the surfaces of the individual specimens were in contact with each other, and the contact pressure (contact surface pressure) applied to the contact surfaces of the two specimens was adjusted to a predetermined pressure using a fixture utilizing the principle of lever. This fixture has a supporting column made of a carbon composite, to which an arm made of a carbon composite is attached in a state such that the arm can rotate round the fixed shaft in the horizontal direction, and gravity of a weight hanging from the arm applies a load to the stacked specimens. Specifically, this fixture constitutes a lever in which the position of the fixed shaft of the arm serves as a support, the position which applies a load to the stacked specimens serves as a point of action, and the position from which the weight hangs serves as a force point, wherein the point of action is positioned between the support and the force point, and gravity of the weight is amplified to act on ber and the material was cooled to about 100° C. or lower in an Ar gas atmosphere at 90 kPa.

With respect to the stacked material which had been subjected to the heating treatment, using an ultrasonic thickness meter (Model 35 DL; manufactured by OLYMPUS CORPORATION), a thickness was measured individually at 49 points of measurement provided at pitches of 3 mm on the 20 mm×20 mm surface of the stacked material as shown in FIG. 2. The probe diameter was 1.5 mm. When a measured value of thickness at a certain point of measurement indicates the total thickness of the steel material 1 and the steel material 2, it can be considered that both the steel materials are unified together due to the diffusion of atoms caused at the position of interface between the steel materials corresponding to that point of measurement. On the other hand, when a measured value of thickness is less than the total thickness of the steel material 1 and the steel material 2, an unbonded portion (defect) is present in the position of interface between the steel materials corresponding to that point of measurement. The inventors have closely studied the relationship between the cross-sectional structures of the stacked materials after the heating treatment and the results of thickness measurement obtained by the above measurement method. As a result, they have confirmed that, by using a value (this is referred to as "bonding ratio") obtained by dividing the number of the point or points of measurement, each of which the result of measurement is the total thickness of the steel material 1 and the steel material 2, by the total number of the points of measurement, i.e., 49, an area ratio of the bonded portion to the contact area can be evaluated with high accuracy. Thus, the diffusion bonding properties were evaluated in accordance with the following criteria.

⊙: Bonding ratio 100% (diffusion bonding properties: excellent)

○: Bonding ratio 90 to 99% (diffusion bonding properties: good)

Δ: Bonding ratio 60 to 89% (diffusion bonding properties: slightly poor)

X: Bonding ratio 0 to 59% (diffusion bonding properties: poor)

From the results of various studies, the material having rating ○ in the evaluation was found to secure a satisfactory strength of the diffusion-bonded portion and have excellent sealing properties between the members (properties such that gas leakage through communicating defects does not occur), and therefore the material having rating ○ or a higher rating in the evaluation was judged to be acceptable.

The results of evaluation are shown in Table 2.

Further, with respect to the stacked material which had been subjected to the heating treatment, the structure of a region including the position of interface in the cross-section taken parallel to the thicknesswise direction was examined under an optical microscope. The results of the examination have confirmed that there is a close correspondence between the degree of progress of the diffusion bonding observed by the examination under a microscope (i.e., the degree of disappearance of the unbonded portions in the position of interface) and the value of the above-mentioned "bonding ratio". FIGS. 3 to 13 show cross-sectional structure photographs of some examples. In the structure photographs shown in the figures, except those having rating ⊙ in the evaluation, a site having unbonded portions as many as possible remaining in the position of interface is intentionally selected and a photograph of the site is taken. Test Nos. assigned to these cross-sectional structure photographs are shown in Table 2.

TABLE 2

| Test No. | Steel type used Steel material 1 | Steel material 2 | Diffusion bonding conditions Contact Surface Pressure (MPa) | Heating temperature (° C.) | Evaluation of bonding properties | Remark | Cross-sectional structure photograph | Classification |
|---|---|---|---|---|---|---|---|---|
| 1 | D-1 | D-1 | 0.1 | 980 | ⊙ | | | Example of the invention |
| 2 | D-1 | D-1 | 0.1 | 1000 | ⊙ | | | Example of the invention |
| 3 | D-1 | D-1 | 0.3 | 900 | ⊙ | | | Example of the invention |
| 4 | D-1 | D-1 | 0.3 | 1000 | ⊙ | | | Example of the invention |
| 5 | D-1 | D-1 | 0.3 | 1080 | ⊙ | | | Example of the invention |
| 6 | D-1 | D-1 | 0.5 | 880 | ○ | | | Example of the invention |
| 7 | D-1 | D-1 | 0.5 | 1000 | ⊙ | | FIG. 3 | Example of the invention |
| 8 | D-1 | D-1 | 0.5 | 1080 | ⊙ | | | Example of the invention |
| 9 | D-1 | D-1 | 0.5 | 1200 | ⊙ | Coarse crystal grains formed | FIG. 4 | Comparative Example |
| 10 | D-1 | D-1 | 0.8 | 880 | ⊙ | | | Example of the invention |
| 11 | D-1 | D-1 | 1.0 | 1030 | ⊙ | | | Example of the invention |
| 12 | D-2 | D-2 | 0.1 | 1030 | ○ | | | Example of the invention |
| 13 | D-2 | D-2 | 0.1 | 1080 | ⊙ | | | Example o the invention |
| 14 | D-2 | D-2 | 0.3 | 1030 | ⊙ | | | Example of the invention |
| 15 | D-2 | D-2 | 0.5 | 1000 | ○ | | FIG. 5 | Example of the invention |
| 16 | D-2 | D-2 | 0.5 | 1080 | ⊙ | | | Example of the invention |
| 17 | D-2 | D-2 | 0.5 | 1200 | ⊙ | Coarse crystal grains formed | FIG. 6 | Comparative Example |
| 18 | D-3 | D-3 | 0.5 | 1030 | ○ | | FIG. 7 | Example of the invention |
| 19 | D-3 | D-3 | 0.5 | 1080 | ⊙ | | | Example of the invention |
| 20 | D-3 | D-3 | 0.5 | 1200 | ⊙ | Coarse crystal grains formed | FIG. 8 | Comparative Example |
| 21 | M-1 | M-1 | 0.5 | 1000 | X | | FIG. 9 | Comparative Example |
| 22 | M-1 | M-1 | 0.5 | 1200 | ⊙ | Coarse crystal grains formed | | Comparative Example |
| 23 | M-1 | M-1 | 0.8 | 1050 | ○ | | | Example of the invention |
| 24 | M-2 | M-2 | 0.5 | 1000 | X | | FIG. 10 | Comparative Example |
| 25 | M-2 | M-2 | 0.5 | 1200 | ⊙ | Coarse crystal grains formed | | Comparative Example |
| 26 | M-2 | M-2 | 0.8 | 1050 | ○ | | | Example of the invention |
| 27 | M-3 | M-3 | 0.5 | 1000 | X | | FIG. 11 | Comparative Example |
| 28 | M-3 | M-3 | 0.5 | 1200 | X | Coarse crystal grains formed | | Comparative Example |
| 29 | D-1 | F-1 | 0.3 | 1000 | ○ | | | Example of the invention |
| 30 | D-1 | F-1 | 0.5 | 1000 | ⊙ | | | Example of the invention |
| 31 | D-1 | A-1 | 0.5 | 1000 | ⊙ | | | Example of the invention |
| 32 | F-1 | F-1 | 0.5 | 1000 | X | | FIG. 12 | Comparative Example |
| 33 | A-1 | A-1 | 0.5 | 1000 | X | | FIG. 13 | Comparative Example |

Underlined value: Outside the scope defined by the invention

As can be seen from Table 2, in the examples of the invention in which the dual-phase steel in the invention was used in both or one of the steel materials, diffusion bonding could be advanced under conditions such that the contact surface pressure is 1.0 MPa or less and the heating temperature is 1,080° C. or lower, obtaining a sound diffusion-bonded portion. The heating temperature, is not required to be set to a temperature as high as 1,100° C. or higher, and hence the formation of coarse crystal grains is suppressed, improving the diffusion-bonded product in mechanical properties. When the dual-phase steel having a γmax of 100 or less (D-1 to D-3) is employed, an appropriate range of the diffusion bonding conditions is expanded toward the lower contact surface pressure and lower holding temperature. Especially when the dual-phase steel having a γmax adjusted to 50 to 80 (D-1, D-2) is used, an appropriate range of the conditions is further expanded, and this is also advantageous from the viewpoint of the production cost.

By contrast, in Comparative Example Nos. 9, 17, 20, 22, and 25, the heating temperature was so high that the formation of coarse crystal grains occurred (see FIGS. 4, 6, and 8). In Nos. 21 and 24, martensitic stainless steel having a γmax of 100 or more was employed as dual-phase steel, and the driving force of transformation to an austenite phase in the dual-phase temperature region is considered to be smaller than that of the steel type having a γmax of less than 100, and diffusion bonding did not proceed when the holding temperature was lowered to 1,000° C. In Nos. 27 and 28, martensitic stainless steel, which is considered to have no temperature region in which it has an austenite+ferrite dual-phase structure, was used in both the steel materials, and thus appropriate diffusion bonding conditions could not be found. In Nos. 32 and 33, the steels which respectively have a ferrite single-phase structure and an austenite single-phase structure at 880 to 1,080° C. were subjected to diffusion bonding, but diffusion bonding could not be achieved at such a low contact surface pressure and a low heating temperature as in the example of the invention.

Example 2

Steel having the chemical composition shown in Table 3 was melted, and hot-rolled into a hot-rolled plate having a thickness of 3 to 4 mm, and subjected to step of successively performing annealing, acid pickling, cold-rolling, finish annealing, and acid pickling to obtain a steel plate to be tested having a thickness of 1.0 mm. D-11 to D-15 are the dual-phase steel in the invention, F-11 is ferrite single-phase steel, and A-11 is austenite single-phase steel. The thickness, surface finish, and surface roughness Ra of each steel plate are also shown in Table 3. With respect to the metallic structure of each of the steel plates, D-11 to D-15 have a (ferrite phase)+carbide, F-11 has a ferrite single phase, and A-11 has an austenite single phase.

TABLE 3

| | Chemical composition (% by mass) | | | | | | | | | | | X value | | Steel plate | | | |
|---|---|---|---|---|---|---|---|---|---|---|---|---|---|---|---|---|---|
| Steel | C | Si | Mn | Ni | Cr | Cu | Mo | Al | Ti | Nb | N | Others | *1 | γmax | Thickness (mm) | Surface finish | Ra (µm) | Remark |
| D-11 | 0.063 | 0.40 | 0.76 | 0.44 | 16.03 | 0.04 | 0.04 | — | — | — | 0.028 | V: 0.03 | 786.3 | 55.0 | 1.0 | 2D | 0.20 | Steel in the invention |
| D-12 | 0.080 | 0.23 | 0.50 | 0.24 | 16.28 | — | — | — | — | — | 0.047 | — | 802.8 | 63.8 | 1.0 | 2D | 0.22 | Steel in the invention |
| D-13 | 0.069 | 0.36 | 0.75 | 0.12 | 16.17 | 0.04 | 0.02 | 0.011 | — | 0.01 | 0.039 | — | 821.2 | 53.3 | 1.0 | 2D | 0.25 | Steel in the invention |
| D-14 | 0.086 | 0.56 | 0.29 | 0.12 | 16.13 | 0.04 | 0.25 | — | 0.010 | 0.02 | 0.025 | B: 0.002 | 875.2 | 45.6 | 1.0 | 2D | 0.19 | Steel in the invention |
| D-15 | 0.064 | 0.54 | 0.31 | 1.90 | 16.37 | 0.04 | 0.04 | 0.004 | 0.004 | — | 0.011 | — | 669.7 | 71.9 | 1.0 | 2D | 0.17 | Steel in the invention |
| F-11 | 0.009 | 0.37 | 0.91 | 0.13 | 18.35 | 0.19 | 2.00 | 0.010 | 0.005 | 0.61 | 0.010 | — | 1127.7 | −62.0 | 1.0 | 2D | 0.25 | Comparative steel |
| A-11 | 0.057 | 0.41 | 1.04 | 8.11 | 18.08 | 0.13 | 0.11 | 0.013 | 0.006 | — | 0.010 | — | −29.7 | 197.7 | 1.0 | 2D | 0.15 | Comparative steel |

*1) In the steel in the invention, the value substantially corresponds to Ae1 point (° C.).

A 100 mm square steel material (hereinafter, referred to as "flat plate material") was prepared by cutting from each of the steel plates to be tested of steels D-11 to D-15. Further, the middle portion of a 100 mm square plate prepared from each of the steel plates to be tested of all the steel types was removed by cutting to prepare a steel material formed from a frame having a width of 5 mm (hereinafter, referred to as "frame material"). In this instance, a burr was not removed. 6 mmϕ holes were formed in each of the flat plate material and the frame material at two positions near the ends of the diagonal line. [1] and [5] of FIG. 14(a) diagrammatically show a size and shape of the flat plate material, and [2] to [4] of FIG. 14(a) diagrammatically show a size and shape of the frame material. As shown in FIG. 14, three frame materials were stacked, and the steel materials were stacked on one another in the stacking order of from [1] to [5] shown in FIG. 14(a) so that the flat plate materials respectively covered both sides of the three stacked frame materials to form a stacked material, and 5 mmϕ pins made of Alloy 600 were inserted into the above holes communicating with the individual steel materials, and a weight having a mass of 5 kg was placed on the upper surface of the stacked material horizontally placed, and the stacked material was subjected to vacuum diffusion bonding. In this instance, a contact pressure of about 0.05 MPa is applied to the contact surface between the steel materials.

Combinations of the steel materials [1] to [5] were the following two patterns.

Pattern A: All the [1] to [5] are the same dual-phase steel type in the invention.

Pattern B: [1], [3], and [5] are the same dual-phase steel type in the invention, and [2] and [4], corresponding to the material opposite to them, are the same austenite steel type or the same ferritic steel type.

Diffusion bonding was conducted by a method in which the stacked material was placed in a vacuum furnace, and the furnace was evacuated so that the pressure became $10^{-3}$ Pa or less, and then the temperature was elevated to the heating temperature set to fall in the range of from 900 to 1,100° C., and that temperature was maintained for 60 minutes, then allowed to cool in the furnace.

[Evaluation of the Reliability of Diffusion-Bonded Portion]

The above-mentioned stainless steel diffusion-bonded product {in the form shown in FIG. 14(b)} was subjected to heating test in air at 800° C. for 24 hours. Then, the resultant product was cut at the position of a-a' of FIG. 14(b) in the stacking direction to visually examine whether the surface of the inner hollow portion (inner surface) was oxidized or not. When voids communicating with the outside are present in the diffusion-bonded portion, or a damage is caused in the diffusion-bonded portion during the heating treatment, oxygen intrudes into the inside of the material, so that the inner surface after the heating test is oxidized and loses the original metallic luster. On the other hand, when soundness of the diffusion-bonded portion is maintained so that the inside of the material is kept in a high vacuum state, the inner surface after the heating test exhibits metallic luster characteristic of stainless steel. A stainless steel diffusion-bonded product having the inner surface which has maintained the original metallic luster was evaluated as "○" (reliability of the diffusion-bonded portion: excellent), and a product other than that product was evaluated as "X" (reliability of the diffusion-bonded portion: poor). The results are shown in Table 4.

providing a dual phase steel having an austenite transformation starting temperature $Ac_1$ point of 650 to 950° C. during the temperature elevation and having an austenite+ferrite dual-phase temperature region in the range of 880° C. or higher and another stainless steel; and diffusion bonding the at least one dual phase steel to the other stainless steel to unify the materials together by direct contact without using any insert material, the diffusion bonding being advanced under conditions such that the contact surface pressure is in the range of 1.0 MPa or less and the heating temperature is in the range of from 880 to 1,080° C. while being accompanied by the movement of grain boundary caused when the ferrite phase in the dual-phase steel undergoes transformation to an austenite phase.

2. A method for producing a stainless steel diffusion-bonded product, comprising:

providing a dual phase steel having a dual-phase temperature region in the range of 880° C. or higher and another stainless steel, the providing step further comprising providing the dual phase steel with a chemical composition (A) comprising from 0.0001 to 0.15% of C, from 0.001 to 1.0% of Si, from 0.001 to 1.0% of Mn, from 0.05 to 2.5% of Ni, from 13.0 to 18.5% of Cr, from 0 to 0.2% of Cu, from 0 to 0.5% of Mo, from 0 to 0.05% of Al, from 0 to 0.2% of Ti, from 0 to 0.2% of Nb, from 0 to 0.2% of V, from 0 to 0.01% of B, and from 0.005 to 0.1% of N, all in terms of percentage by mass, with the balance of Fe and unavoidable impurities and having the composition satisfy a formula (1) where X is 650 to 950 and X is defined by the formula (1) wherein $X$ value=35(Cr+1.72Mo+2.09Si+4.86Nb+8.29V+1.77Ti+21.4Al+40.0B−7.14C−8.0N−3.28Ni−1.89Mn−0.51Cu)+310     (1); and

TABLE 4

| Test No. | Combination of steel materials | | Heating holding conditions for diffusion bonding | Evaluation of reliability of diffusion-bonded portion *1 | Classification |
|---|---|---|---|---|---|
| | Steel of steel Materials [1], [3], and [5] | Steel of steel Materials [2] and [4] | | | |
| 41 | D-11 | D-11 | 900° C. × 60 min | ○ | Example of the invention |
| 42 | D-12 | D-12 | 880° C. × 60 min | ○ | Example of the invention |
| 43 | D-12 | D-12 | 1080° C. × 60 min | ○ | Example of the invention |
| 44 | D-13 | D-13 | 900° C. × 60 min | ○ | Example of the invention |
| 45 | D-14 | D-14 | 1000° C. × 60 min | ○ | Example of the invention |
| 46 | D-15 | D-15 | 900° C. × 60 min | ○ | Example of the invention |
| 47 | D-15 | F-11 | 1000° C. × 60 min | ○ | Example of the invention |
| 48 | D-15 | F-12 | 1000° C. × 60 min | ○ | Example of the invention |
| 49 | F-11 | F-11 | 1100° C. × 60 min | X | Comparative Example |
| 50 | F-12 | F-12 | 1100° C. × 60 min | X | Comparative Example |

*1) In the diffusion-bonded product which has been subjected to heating test in air at 800° C. × 24 h, ○: Inner surface is not oxidized, X: Inner surface is oxidized.

As can be seen from Table 4, by using the dual-phase steel in the invention in at least one of the steel materials in the diffusion-bonded portion, a diffusion-bonded product having excellent reliability was obtained at a temperature as low as 880 to 1,000° C.

By contrast, in Nos. 49 and 50 as Comparative Examples in which the dual-phase steel was not used, a diffusion-bonded product having excellent reliability was not obtained even at 1,100° C.

The invention claimed is:

1. A method for producing a stainless steel diffusion-bonded product, comprising:

diffusion bonding the at least one dual phase steel to the other stainless steel to unify the materials together by direct contact without using any insert material, the diffusion bonding being advanced under conditions such that the contact surface pressure is in the range of 1.0 MPa or less and the heating temperature is in the range of from 880 to 1,080° C. while being accompanied by the movement of grain boundary caused when the ferrite phase in the dual-phase steel undergoes transformation to an austenite phase.

3. A method for producing a stainless steel diffusion-bonded product, comprising:

providing a dual phase steel having a dual-phase temperature region in the range of 880° C. or higher and another stainless steel, the providing step further comprising providing the dual phase steel with a chemical composition (A) comprising from 0.0001 to 0.15% of C, from 0.001 to 1.0% of Si, from 0.001 to 1.0% of Mn, from 0.05 to 2.5% of Ni, from 13.0 to 18.5% of Cr, from 0 to 0.2% of Cu, from 0 to 0.5% of Mo, from 0 to 0.05% of Al, from 0 to 0.2% of Ti, from 0 to 0.2% of Nb, from 0 to 0.2% of V, from 0 to 0.01% of B, and from 0.005 to 0.1% of N, all in terms of percentage by mass, with the balance of Fe and unavoidable impurities and having the composition satisfy a formula (1) where X is 650 to 950 and X is defined by the formula (1) wherein $$X \text{ value} = 35(Cr+1.72Mo+2.09Si+4.86Nb+8.29V+1.77Ti+21.4Al+40.0B-7.14C-8.0N-3.28Ni-1.89Mn-0.51Cu)+310 \quad (1);$$

and providing the other stainless steel with a chemical composition (B) comprising from 0.0001 to 0.15% of C, from 0.001 to 4.0% of Si, from 0.001 to 2.5% of Mn, from 0.001 to 0.045% of P, from 0.0005 to 0.03% of S, from 6.0 to 28.0% of Ni, from 15.0 to 26.0% of Cr, from 0 to 7.0% of Mo, from 0 to 3.5% of Cu, from 0 to 1.0% of Nb, from 0 to 1.0% of Ti, from 0 to 0.1% of Al, from 0 to 0.3% of N, from 0 to 0.01% of B, from 0 to 0.5% of V, from 0 to 0.3% of W, and from 0 to 0.1% of the total of Ca, Mg, Y, and REM (rare earth elements), all in terms of percentage by mass, with the balance of Fe and unavoidable impurities; and diffusion bonding the dual phase steel and the other stainless steel with each other to unify the materials together by direct contact without using any insert material, the diffusion bonding being advanced under conditions such that the contact surface pressure is in the range of 1.0 MPa or less and the heating temperature is in the range of from 880 to 1,080° C. while being accompanied by the movement of grain boundary caused when the ferrite phase in the dual-phase steel undergoes transformation to an austenite phase.

4. A method for producing a stainless steel diffusion-bonded product, comprising:

providing a dual phase steel having a dual-phase temperature region in the range of 880° C. or higher and another stainless steel, the providing step further comprising providing the dual phase steel with a chemical composition (A) comprising from 0.0001 to 0.15% of C, from 0.001 to 1.0% of Si, from 0.001 to 1.0% of Mn, from 0.05 to 2.5% of Ni, from 13.0 to 18.5% of Cr, from 0 to 0.2% of Cu, from 0 to 0.5% of Mo, from 0 to 0.05% of Al, from 0 to 0.2% of Ti, from 0 to 0.2% of Nb, from 0 to 0.2% of V, from 0 to 0.01% of B, and from 0.005 to 0.1% of N, all in terms of percentage by mass, with the balance of Fe and unavoidable impurities, and having the composition satisfy a formula (1) where X is 650 to 950 and X is defined by the formula (1) wherein $$X \text{ value} = 35(Cr+1.72Mo+2.09Si+4.86Nb+8.29V+1.77Ti+21.4Al+40.0B-7.14C-8.0N-3.28Ni-1.89Mn-0.51Cu)+310 \quad (1),$$

and providing the other stainless steel with a chemical composition (C) comprising from 0.0001 to 0.15% of C, from 0.001 to 1.2% of Si, from 0.001 to 1.2% of Mn, from 0.001 to 0.04% of P, from 0.0005 to 0.03% of S, from 0 to 0.6% of Ni, from 11.5 to 32.0% of Cr, from 0 to 2.5% of Mo, from 0 to 1.0% of Cu, from 0 to 1.0% of Nb, from 0 to 1.0% of Ti, from 0 to 0.2% of Al, from 0 to 0.025% of N, from 0 to 0.01% of B, from 0 to 0.5% of V, from 0 to 0.3% of W, and from 0 to 0.1% of the total of Ca, Mg, Y, and REM (rare earth elements), all in terms of percentage by mass, with the balance of Fe and unavoidable impurities; and diffusion bonding the dual phase steel to the other stainless steel to unify the materials together by direct contact without using any insert material, the diffusion bonding being advanced under conditions such that the contact surface pressure is in the range of 1.0 MPa or less and the heating temperature is in the range of from 880 to 1,080° C. while being accompanied by the movement of grain boundary caused when the ferrite phase in the dual-phase steel undergoes transformation to an austenite phase.

5. The method for producing a stainless steel diffusion-bonded product according to claim 2, wherein the dual-phase steel having the chemical composition (A) is a steel having a γmax represented by the formula (2) below of 20 to less than 100:

$$\gamma\text{max} = 420C-11.5Si+7Mn+23Ni-11.5Cr-12Mo+9Cu-49Ti-50Nb-52Al+470N+189 \quad (2).$$

6. The method for producing a stainless steel diffusion-bonded product according to claim 2, wherein the dual-phase steel having the chemical composition (A) is a steel having a γmax represented by the formula (2) below of 20 to less than 100, and the diffusion bonding is advanced under conditions such that the contact surface pressure is in the range of from 0.03 to 0.8 MPa and the heating temperature is in the range of from 880 to 1,030° C. while being accompanied by the movement of grain boundary caused when the ferrite phase in the dual-phase steel undergoes transformation to an austenite phase:

$$\gamma\text{max} = 420C-11.5Si+7Mn+23Ni-11.5Cr-12Mo+9Cu-49Ti-50Nb-52Al+470N+189 \quad (2).$$

7. The method for producing a stainless steel diffusion-bonded product according to claim 3, wherein the dual-phase steel having the chemical composition (A) is a steel having a γmax represented by the formula (2) below of 20 to less than 100:

$$\gamma\text{max} = 420C-11.5Si+7Mn+23Ni-11.5Cr-12Mo+9Cu-49Ti-50Nb-52Al+470N+189 \quad (2).$$

8. The method for producing a stainless steel diffusion-bonded product according to claim 3, wherein the dual-phase steel having the chemical composition (A) is a steel having a γmax represented by the formula (2) below of 20 to less than 100, and the diffusion bonding is advanced under conditions such that the contact surface pressure is in the range of from 0.03 to 0.8 MPa and the heating temperature is in the range of from 880 to 1,030° C. while being accompanied by the movement of grain boundary caused when the ferrite phase in the dual-phase steel undergoes transformation to an austenite phase:

$$\gamma\text{max} = 420C-11.5Si+7Mn+23Ni-11.5Cr-12Mo+9Cu-49Ti-50Nb-52Al+470N+189 \quad (2).$$

9. The method for producing a stainless steel diffusion-bonded product according to claim 4, wherein the dual-phase steel having the chemical composition (A) is a steel having a γmax represented by the formula (2) below of 20 to less than 100:

$$\gamma\text{max} = 420C-11.5Si+7Mn+23Ni-11.5Cr-12Mo+9Cu-49Ti-50Nb-52Al+470N+189 \quad (2).$$

10. The method for producing a stainless steel diffusion-bonded product according to claim 4, wherein the dual-phase steel having the chemical composition (A) is a steel having a γmax represented by the formula (2) below of 20 to less than 100, and the diffusion bonding is advanced under conditions such that the contact surface pressure is in the range of from 0.03 to 0.8 MPa and the heating temperature is in the range of from 880 to 1,030° C. while being accompanied by the movement of grain boundary caused when the ferrite phase in the dual-phase steel undergoes transformation to an austenite phase:

$$\gamma max = 420C - 11.5Si + 7Mn + 23Ni - 11.5Cr - 12Mo + 9Cu - 49Ti - 50Nb - 52Al + 470N + 189 \quad (2).$$

* * * * *